United States Patent [19]

Surjaatmadja

[11] Patent Number: 5,396,805
[45] Date of Patent: Mar. 14, 1995

[54] FORCE SENSOR AND SENSING METHOD USING CRYSTAL RODS AND LIGHT SIGNALS

[75] Inventor: Jim B. Surjaatmadja, Duncan, Okla.

[73] Assignee: Halliburton Company, Duncan, Okla.

[21] Appl. No.: 129,622

[22] Filed: Sep. 30, 1993

[51] Int. Cl.⁶ .............................................. G01L 1/24
[52] U.S. Cl. ...................... 73/800; 73/705; 356/32
[58] Field of Search .............. 73/9, 800, 705, 862.624; 356/32

[56] References Cited

U.S. PATENT DOCUMENTS

| | | | |
|---|---|---|---|
| 4,336,719 | 6/1982 | Lynnworth | 73/861.27 |
| 4,492,121 | 1/1985 | Lehto | 73/705 |
| 4,577,100 | 3/1986 | Meltz et al. | 250/231 P |
| 4,848,871 | 7/1989 | Seidel et al. | 350/96.29 |
| 4,930,862 | 6/1990 | Miers et al. | 350/96.29 |
| 5,004,913 | 4/1991 | Kleinerman | 250/227.21 |
| 5,004,914 | 4/1991 | Vali et al. | 250/227.27 |
| 5,012,679 | 5/1991 | Haefner | 73/800 |

FOREIGN PATENT DOCUMENTS

| | | | |
|---|---|---|---|
| 2068538 | 8/1981 | United Kingdom | 356/32 |
| 1485009 | 6/1989 | U.S.S.R. | 356/32 |

Primary Examiner—Hezron E. Williams
Assistant Examiner—James M. Olsen
Attorney, Agent, or Firm—Stephen R. Christian; E. Harrison Gilbert, III

[57] ABSTRACT

A force sensor and a force sensing method use crystal rods as both force responsive elements and light transmission media in combination with light input circuitry and processing circuitry to sense an applied force, such as oil or gas well pressure or fluid flow friction.

12 Claims, 3 Drawing Sheets

FORCE SENSOR AND SENSING METHOD USING CRYSTAL RODS AND LIGHT SIGNALS

BACKGROUND OF THE INVENTION

This invention relates generally to force sensors and force sensing methods. This invention can be used for sensing pressures and fluid flow frictional forces, for example.

Two physical parameters of importance in the oil and gas industry are pressure and fluid flow friction. Pressure in an oil or gas well is used for analyzing the ability of the well to produce hydrocarbons, for example. Friction of a flowing fluid, such as in a tubular member or string in a well or an annulus thereabout, is used for calculating pressure losses in the tubular string or annulus during treatment processes and during the production phase of the well.

Pressure measurements can be performed in many ways. For high pressure measurements in oil or gas wells, Bourdon tubes, strain gauges, and crystal transducers have been used. Bourdon tubes are typically not accurate as compared to at least some more recent downhole pressure measuring devices. Strain gauge sensors are also not too accurate, but they are widely used because they are relatively inexpensive. Pressure sensors having crystal resonators are highly accurate; however, they are also relatively expensive and temperature sensitive. This latter characteristic can require sophisticated temperature correction schemes. There is the need for a preferably less expensive but accurate force sensor that can sense pressure, particularly high pressure in an oil or gas well, under various temperature conditions.

Friction measurements have been made using friction sensors that are located in a flow line, but these devices typically need to be long if accuracy is needed. Friction measurements have also been empirically made using laboratory data. These empirical measurements are based on values of "n" and "k" developed from laboratory experiments. This type of friction determination can be inaccurate because actual field generated fluids are often different from test fluids created in the lab. Moreover, using n and k values creates computational errors in two ways: converting friction or shear values to n and k values, and then using the n and k values to convert dimensional values to friction or shear values. There is the need for a more compact force sensor that can be located in-line to sense actual frictional forces, even of abrasive and other material-attacking fluids such as are encountered in the oil and gas industry, so that the typically less accurate empirical technique does not have to be used.

There is also the need for a corresponding method for sensing force, such as either pressure or fluid flow friction.

SUMMARY OF THE INVENTION

The present invention overcomes the above-noted and other shortcomings of the prior art by providing a novel and improved force sensor and method for sensing a force. The present invention can be used to sense pressure and fluid flow friction, for example. In preferred embodiments, the present invention can be exposed to high pressures and temperatures and abrasive (and other) fluids such as are present or used in oil or gas wells.

The force sensor of the present invention comprises: a first crystal rod having a light input port, a light output port, a light reflective portion and crystalline structure intrinsic to the first crystal rod communicating the light input port with the light reflective portion and communicating the light reflective portion with the light output port; a second crystal rod having a light input port, a light output port, a light reflective portion and crystalline structure intrinsic to the second crystal rod communicating the light input port of the second crystal rod with the light reflective portion of the second crystal rod and communicating the light reflective portion of the second crystal rod with the light output port of the second crystal rod; light input means for communicating respective light signals into the light input ports of the first and second crystal rods so that each respective communicated light signal travels through the respective crystalline structure to the respective light reflective portion and reflects therefrom to the respective light output port, which light input means includes a laser; and processing circuit means for determining a difference between the light output from the light output ports of the first and second crystal rods, wherein the difference represents a force applied to at least one of the first and second crystal rods.

The method of sensing a force of the present invention comprises: transmitting a first light signal into a first crystal rod so that the first light signal travels through the first crystal rod, reflects off a reflective portion of the first crystal rod and exits the first crystal rod; transmitting a second light signal into a second crystal rod so that the second light signal travels through the second crystal rod, reflects off a reflective portion of the second crystal rod and exits the second crystal rod; applying to at least the first crystal rod a force to be sensed so that the length of at least the first crystal rod changes in response to the applied force; and detecting a phase shift between the first and second light signals exiting the first and second crystal rods, respectively, wherein the detected phase shift is responsive to the change in length of at least the first crystal rod and thus to the force applied thereto.

Therefore, from the foregoing, it is a general object of the present invention to provide a novel and improved force sensor and force sensing method. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 4 is a schematic timing diagram illustrating pulses output by differentiators used in the preferred embodiments of FIGS. 2 and 3.

DETAILED DESCRIPTION OF PREFERRED EMBODIMENTS

Figure 1:
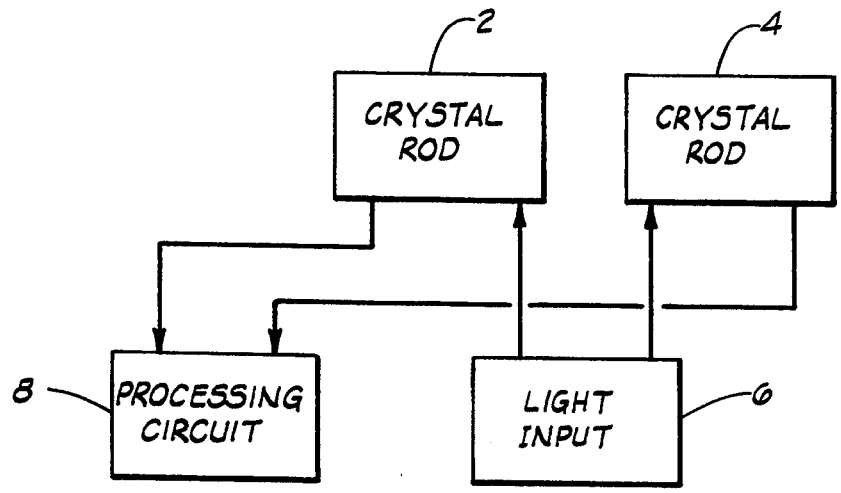
FIG. 1 is a block diagram of the force sensor of the present invention.

Referring to FIG. 1, a force sensor of the present invention comprises a first crystal rod 2, a second crystal rod 4, light input means 6 for communicating respective light signals into the crystal rods, and processing circuit means 8 for determining a difference between light signals output from the crystal rods, wherein the difference represents a force applied to at least one of the crystal rods. The crystal rods 2, 4 are of particular significance because they have intrinsic crystalline structures that act as light waveguides and they provide the substance against which the force to be sensed acts. That is, in the present invention multiple components, such as a support and a fiber-type waveguide do not have to be combined to provide the force responsive, light transmissive structure. The crystal rods 2, 4 enable the force sensor and the method of the present invention to be used in high pressure and difficult environments because of the strength and durability of the crystal rods. Although any suitable crystal can be used, the preferred embodiments include any optical glass or quartz crystals. Quartz crystal is the preferred material for ultra high pressure measurements, such as are needed in oil or gas wells. Zerodur ® (from Schott) glass ceramics, sapphire and LNo crystals (from Union Carbide) are non-limiting examples of other materials that may be suitable in various applications. As used in this specification and in the accompanying claims, "rod" encompasses any elongated member regardless of cross-sectional shape and further regardless whether it is straight or curved.

Figure 2:
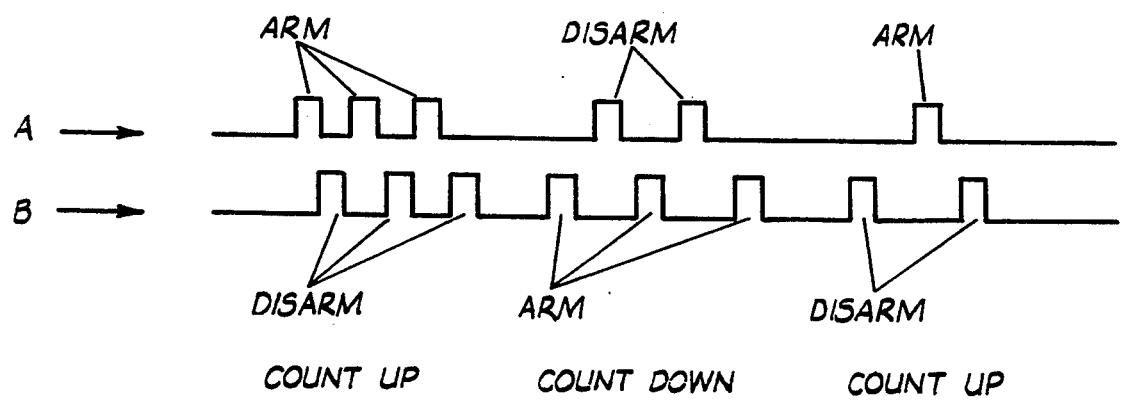
FIG. 2 is a schematic and block diagram of a pressure-sensing embodiment of the force sensor represented in FIG. 1.
Figure 2:
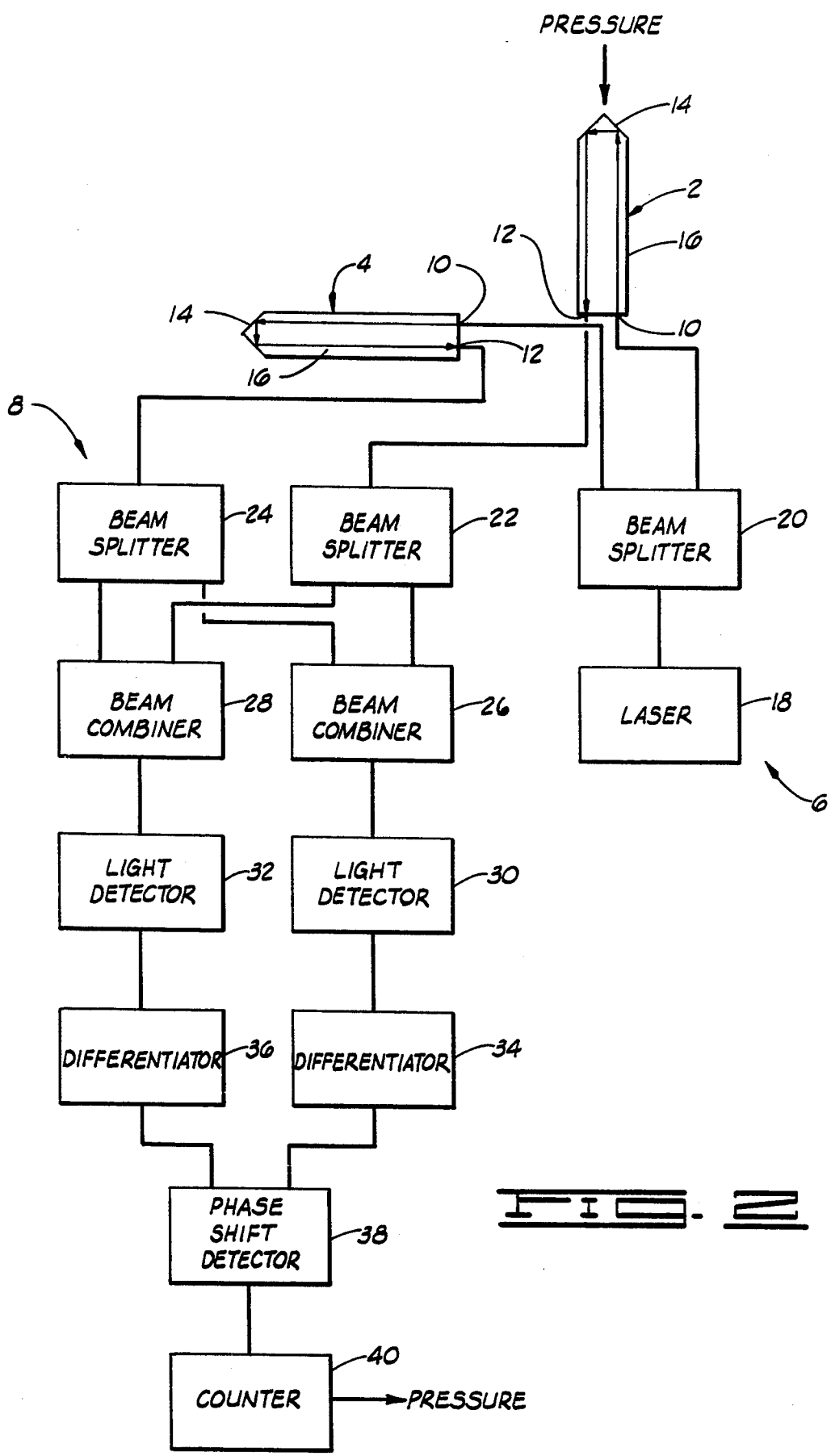

A preferred embodiment of the force sensor generally represented in FIG. 1 is shown in FIG. 2. This embodiment is a pressure sensor wherein an oil or gas well pressure can be applied to the crystal rod 2 as indicated in FIG. 2. As used in this specification and in the accompanying claims, "oil or gas well pressure" encompasses both such pressure as exists in the well and an equivalent pressure as created in, for example, a laboratory environment. Thus, the embodiment of FIG. 2 can be used either in or out of the well itself. The embodiment of FIG. 2 is particularly suitable for sensing oil or gas well pressure up to about 30,000 pounds per square inch. Although useful at lower pressures, it is particularly useful at the high end range of about 20,000 pounds per inch to about 30,000 pounds per square inch where at least some prior downhole pressure sensors are not reliably functional.

The crystal rod 2 of the embodiment shown in FIG. 2 is represented as having a light input port 10 and a light output port 12 at one end of the rod (but these can be located elsewhere depending on the design of the rod). It is also represented in FIG. 2 as having a conical light reflective portion 14 at the opposite end of the rod. The crystalline structure, designated by the reference numeral 16, intrinsic to the crystal rod 2 communicates the light input port 10 with the light reflective portion 14 so that a light signal entering the input port 10 travels through the crystalline structure 16 to the reflective portion 14. The crystalline structure 16 also communicates the light reflective portion 14 with the light output port 12 so that the light signal reflected from the portion 14 travels through the crystalline structure 16 to the output port 12. Thus, two light waveguide channels are defined in a known manner in the crystalline structure 16.

The crystal rod 4 of the FIG. 2 embodiment preferably is identical to the crystal rod 2. Thus, the corresponding features in the crystal rod 4 are identified in FIG. 2 by the same reference numerals as used with the crystal rod 2.

In the pressure sensor embodiment of FIG. 2, the pressure is communicated to and applied against the end of the crystal rod 2 having the reflective portion 14. This causes the crystal rod 2 to contract or be compressed, thereby shortening the light transmission path through the rod 2. The second crystal rod 4 is isolated from sensing the pressure to which the first crystal rod is exposed; however, both of the crystal rods 2, 4 are in the vicinity of each other so that both are exposed to the same temperature. This nulls temperature effects in the sensor.

The response of the crystal rod 2 to the applied pressure and the nulling effect due to the response of both crystal rods 2, 4 to temperature are detected by a phase shift between two light signals input into the rods 2, 4 by the light input means 6. As represented in FIG. 2, the light input means 6 includes a laser 18, such as a monochromatic diode laser. The light input means 6 further includes an input beam splitter 20, such as a 3 dB Y-junction. The beam splitter 20 has an input connected to the laser 18, and it has first and second outputs connected to the light input ports 10 of the first and second crystal rods 2, 4, respectively. The light signals from the beam splitter 20 are coupled into the light input ports 10 of the first and second crystal rods 2, 4 so that each respective communicated light signal travels through the respective crystalline structure 16 to the respective light reflective portion 14 and reflects therefrom to the respective light output port 12. The connections between the laser 18 and the beam splitter 20 and between the beam splitter 20 and the input ports 10 can be made using optical fibers or other suitable connective optical waveguide medium.

The reflected light signals obtained at the output ports 12 of the crystal rods 2, 4 are processed in a conventional manner through the processing circuit 8. In the FIG. 2 embodiment, the processing circuit 8 is conventional (as is the light input means 6). This processing circuit includes: (1) an output beam splitter 22 connected to the light output port 12 of the crystal rod 2; (2) an output beam splitter 24 connected to the light output port 12 of the crystal rod 4; (3) a beam combiner 26 connected to the output beam splitters 22, 24; (4) a beam combiner 28 connected to the output beam splitters 22, 24; (5) a light detector 30 connected to the beam combiner 26; (6) a light detector 32 connected to the beam combiner 28; (7) a differentiator 34 connected to the light detector 30; (8) a differentiator 36 connected to the light detector 32; (9) a phase shift detector 38 connected to the differentiators 34, 36; and (10) a counter 40 connected to the phase shift detector 38. The connections from a light output port 12 to the respective output beam splitter, and from there to the respective beam combiner, and from there to the respective light detector can be made using optical fibers or other suitable connective optical waveguide medium. Connections of the light detectors to their respective differentiators, and from there to the phase shift detector and on to the counter are conventional electrical connections.

The components of the light input means 6 and the processing circuit means 8 and how they work are conventional and known in the art. See, for example, U.S. Pat. No. 5,004,914 to Vali et al. Specific implementations of these components include: monochromatic diode laser from Power Technology Inc. or Philips (Netherlands); beam splitters and beam combiners from E-Tek Dynamics; light detectors from EEG Reticon (charge coupled device) or Fairchild (line scan camera chip or KAF 4200 CCD); and differentiators, phase shift detector and counter from Halliburton Services.

Because the signal processing technique used in the preferred embodiment of the present invention is conventional, it will only be described briefly.

Generally, the intensity of the light detected at the outputs of the beam combiners 26, 28 depends largely upon the phase difference between the respective inputs to the beam combiners 26, 28. This phase difference is caused by the difference in the length of the two rods 2, 4 as caused by the pressure applied to the rod 2. Such length changes generate fringes which are detected to produce output pulses from the respective differentiator. One stream of these pulses is counted by the counter 40. The count from the counter 40 is converted in known manner to a corresponding pressure reading.

The double output processing channel embodiment shown in FIG. 2 is preferred. If the output from only one of the beam combiners 26, 28 were used, then only changes would be measured without knowing the trend (i.e., whether the measured pressure were increasing or decreasing). When the outputs from both beam combiners 26, 28 are used, which outputs have the same frequency of fringes but differ by a constant phase shift, the trend can also be determined.

More specifically, identical fringes from the beam combiners 26, 28 will be detected by the light detectors 30, 32 and their associated differentiators 34, 36, respectively; however, the output from one of the beam combiners 26, 28 will lag the other by a certain phase shift due to the light paths that include the beam splitter 22/beam combiner 26 and the beam splitter 24/beam combiner 28, respectively, having different lengths (which is likely to occur naturally for any given layout of components, but which can be specifically designed as needed). The amount of lag can be adjusted by modifying one or both light paths as desired.

This lag is used by the phase shift detector 38, which has an "arm" and "disarm" circuit to control the direction of the count obtained by the counter 40. Referring to FIG. 4, if the "A" signal is from one of the differentiators 34, 36 and the "B" signal is from the other differentiator, and if "A" is associated with increasing pressure and "B" with decreasing pressure, then "arming" that occurs due to "A" causes the counter 40 to count up and "arming" due to "B" causes the counter 40 to count down. Same direction counting occurs when an "arming" pulse of one signal is followed by a "disarming" pulse from the other signal. If two pulses occur in one signal without an intervening pulse from the other signal, the second pulse acts as the "disarming" pulse so that the next pulse, whether in the same or the other signal, becomes an "arming" signal. This is how counting reversal can occur. Examples of these situations are designated in FIG. 4.

Figure 3:
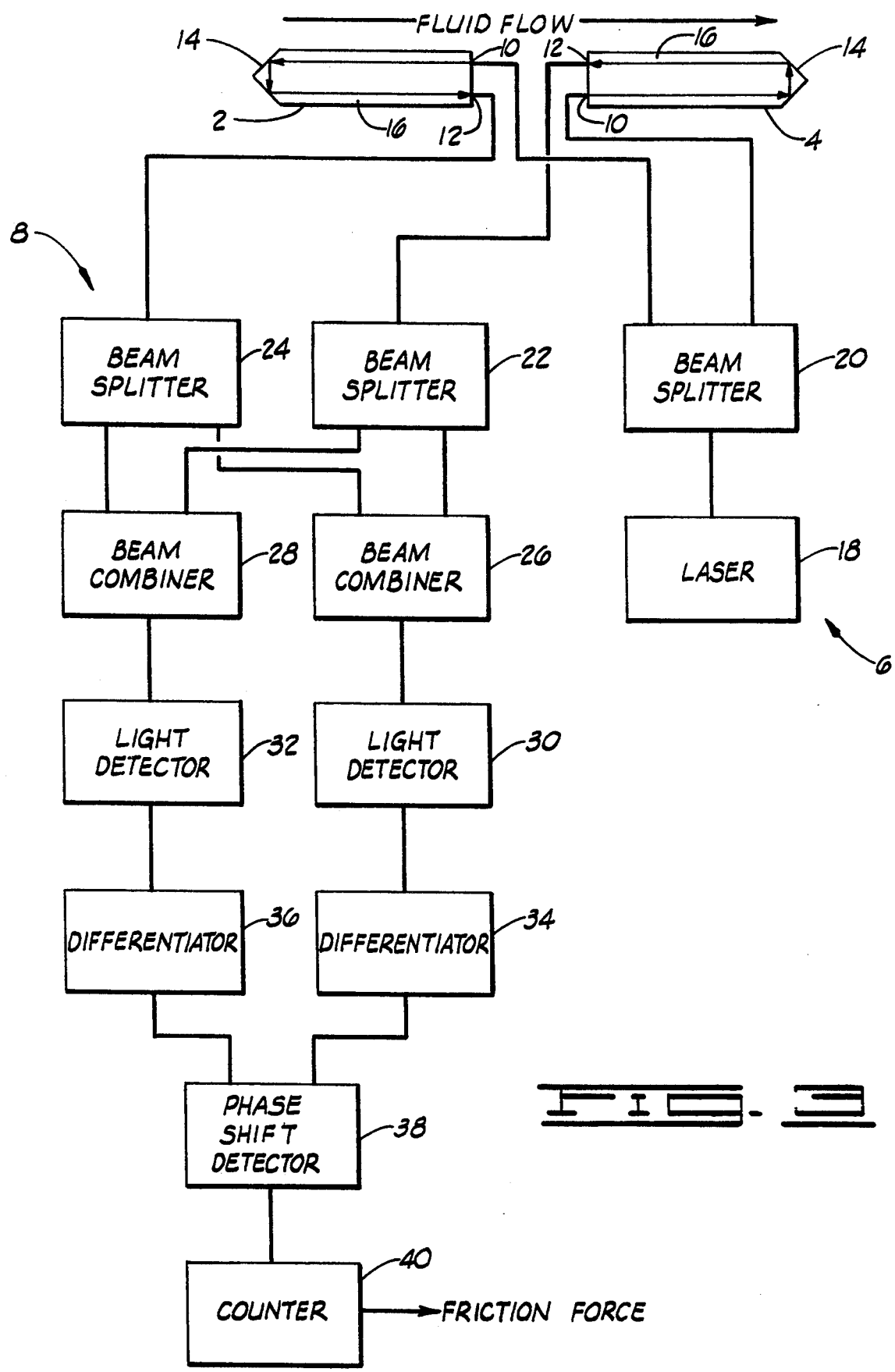
FIG. 3 is a schematic and block diagram of a fluid flow friction-sensing embodiment of the force sensor represented in FIG. 1.

Another preferred embodiment of the force sensor generally represented in FIG. 1 is shown in FIG. 3. This embodiment is an in-line sensor for sensing a frictional force of a fluid flowing parallel to and in contact with the first and second crystal rods 2, 4. Any suitable fluid can be used; including but not limited to abrasive fluids and the like. Abrasive fluids with which the FIG. 3 embodiment can be used include a proppant-carrying fracturing fluid for an oil or gas well and a cement slurry for an oil or gas well. Other types of material attacking fluids include, for example, acid for treating a well.

The components and the signal processing used in the FIG. 3 embodiment are the same as described above with reference to FIG. 2; however, in the FIG. 3 embodiment both of the crystal rods 2, 4 are exposed to the flow of fluid so that both crystal rods respond to the frictional force of the fluid flow. As illustrated in FIG. 3, the crystal rods 2, 4 are disposed parallel to the fluid flow but in oppositely oriented directions. That is, the light reflective portion 14 of one of the crystal rods 2, 4 is upstream of the light input port 10 thereof and the light input port 10 of the other crystal rod is upstream of the light reflective portion 14 thereof. One specific orientation is to align the crystal rods 2, 4 collinearly as illustrated in FIG. 3. The facing ends of the rods 2, 4 are fixed by a suitable fixture or mounting, whereas the opposite ends are allowed to move at least axially. At least portions of the lengths of the rods 2, 4 are directly exposed to the flowing fluid so that the fluid is adjacent and engages these portions of the rods whereby the lengths of the rods are responsively changed (one being compressed and the other extended). To increase frictional engagement, the surfaces of the exposed portions can be conditioned (e.g., roughened).

The embodiment of FIG. 3 provides an accurate friction sensor or meter. The rods 2, 4 can be designed with different diameters to simulate exact downhole dimensions of the wellbore or tubing through which the flow is to occur. More than one of the embodiments shown in FIG. 3 can also be used to simulate different downhole well dimensions. The FIG. 3 embodiment can also be used directly in a well.

The orientation of the rods 2, 4 in FIG. 3 and their exposure to the fluid allows sensitivity or amplification to be doubled as one rod is compressed and the other extended; however, only one of the rods need be exposed to the fluid if a lower sensitivity were acceptable. Because the frictional force is relatively small in the particular application of fluid flow at a well site, the illustrated embodiment is preferred.

Either of the above-described embodiments can be used to perform the method of the present invention. This method of sensing a force comprises transmitting a first light signal into the crystal rod 2 so that the first light signal travels through the crystal rod 2, reflects off the reflective portion 14 thereof and exits the crystal rod 2. The method further comprises transmitting a second light signal into the crystal rod 4 so that the second light signal travels through the crystal rod 4, reflects off the reflective portion thereof and exits the crystal rod 4.

The method still further comprises applying to at least the crystal rod 2 a force to be sensed so that the length of the crystal rod 2 changes in response to the applied force. Because this length change affects the length of the light transmission path through the crystal rod, the light signal in the rod to which the force is applied is affected by the applied force. Using this, the method also comprises detecting a phase shift between the light signals exiting the two crystal rods, wherein the detected phase shift is responsive to the change in length(s) of the affected crystal rod(s) and thus to the force applied thereto.

As described above, the light signals are laser light signals, specifically as obtained by generating a laser light signal and splitting the laser light signal into the two light signals applied to the two crystal rods. These signals are transmitted wholly within the crystal rods 2, 4. In the friction sensing embodiment described above, the two light signals are transmitted in opposite directions to each other.

The method of the present invention preferably includes steps defined relative to the oil or gas well pressure and friction aspects described above. As to the pressure sensor embodiment, it can be carried into the well in any conventional manner, such as in a tubing string. The sensor would be mounted so that an end of the crystal rod 2 in the FIG. 2 embodiment would be exposed or exposable to the pressure to be sensed. As to the friction sensor, it would likely be disposed at the surface, modeling the downhole environment into which the fluid is to flow; however, it would be possible to use the friction sensor within the well.

The magnitude of the sensed force is determined as described above.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A force sensor, comprising:
   a first crystal rod having a light input port, a light output port, a light reflective portion and crystalline structure intrinsic to said first crystal rod communicating said light input port with said light reflective portion and communicating said light reflective portion with said light output port;
   a second crystal rod having a light input port, a light output port, a light reflective portion and crystalline structure intrinsic to said second crystal rod communicating said light input port of said second crystal rod with said light reflective portion of said second crystal rod and communicating said light reflective portion of said second crystal rod with said light output port of said second crystal rod;
   light input means for communicating respective light signals into said light input ports of said first and second crystal rods so that each respective communicated light signal travels through the respective said crystalline structure to the respective said light reflective portion and reflects therefrom to the respective said light output port, said light input means including a laser; and
   processing circuit means for determining a difference between the light output from said light output ports of said first and second crystal rods, wherein said difference represents a force applied to at least one of said first and second crystal rods;
   wherein said first and second crystal rods are both exposed to a flow of fluid so that both said first and second crystal rods respond to a frictional force of the fluid flow; and
   wherein said first and second crystal sensors are disposed parallel to the fluid flow so that said light reflective portion of one of said first and second crystal rods is upstream of said light input port thereof and so that said light input port of the other of said first and second crystal rods is upstream of said light reflective portion thereof.

2. A force sensor as defined in claim 1, wherein said first and second crystal rods are collinear.

3. A force sensor as defined in claim 1, wherein:
   said light input means further includes an input beam splitter having an input connected to said laser and having first and second outputs connected to said light input ports of said first and second crystal rods, respectively; and
   said processing circuit means includes:
      a first output beam splitter connected to said light output port of said first crystal rod;
      a second output beam splitter connected to said light output port of said second crystal rod;
      a first beam combiner connected to said first and second output beam splitters;
      a second beam combiner connected to said first and second output beam splitters;
      a first light detector connected to said first beam combiner;
      a second light detector connected to said second beam combiner;
      a first differentiator connected to said first light detector;
      a second differentiator connected to said second light detector;
      a phase shift detector connected to said first and second differentiators; and
      a counter connected to said phase shift detector.

4. A method of sensing a force, comprising:
   transmitting a first light signal into a first crystal rod so that the first light signal travels through the first crystal rod, reflects off a reflective portion of the first crystal rod and exits the first crystal rod;
   transmitting a second light signal into a second crystal rod so that the second light signal travels through the second crystal rod, reflects off a reflective portion of the second crystal rod and exits the second crystal rod;
   applying to at least the first crystal rod a force to be sensed so that the length of at least the first crystal rod changes in response to the applied force; and
   detecting a phase shift between the first and second light signals exiting the first and second crystal rods, respectively, wherein the detected phase shift is responsive to the change in length of at least the first crystal rod and thus to the force applied thereto;
   wherein said transmitting a first light signal and transmitting a second light signal include transmitting said first and second light signals in opposite directions to each other.

5. A method as defined in claim 4, wherein the force applied to at least the first crystal rod is a frictional force of a fluid flowing parallel to and in contact with the first and second crystal rods.

6. A method as defined in claim 5, wherein the fluid is a fracturing fluid for an oil or gas well.

7. A method as defined in claim 5, wherein the fluid is a cement slurry for an oil or gas well.

8. A method as defined in claim 5, wherein the fluid is an acid for an oil or gas well.

9. A method of sensing a force, comprising:
   transmitting a first light signal into a first crystal rod so that the first light signal travels through the first crystal rod, reflects off a reflective portion of the first crystal rod and exits the first crystal rod;
   transmitting a second light signal into a second crystal rod so that the second light signal travels through the second crystal rod, reflects off a reflective portion of the second crystal rod and exits the second crystal rod;

applying to at least the first crystal rod a force to be sensed so that the length of at least the first crystal rod changes in response to the applied force; and detecting a phase shift between the first and second light signals exiting the first and second crystal rods, respectively, wherein the detected phase shift is responsive to the change in length of at least the first crystal rod and thus to the force applied thereto;

wherein the force applied to at least the first crystal rod is an oil or gas well pressure.

10. A method as defined in claim 9, wherein the oil or gas well pressure is within the range between about 20,000 pounds per square inch and about 30,000 pounds per square inch.

11. A method of sensing a force, comprising:

transmitting a first light signal into a first crystal rod so that the first light signal travels through the first crystal rod, reflects off a reflective portion of the first crystal rod and exits the first crystal rod;

transmitting a second light signal into a second crystal rod so that the second light signal travels through the second crystal rod, reflects off a reflective portion of the second crystal rod and exits the second crystal rod;

applying to at least the first crystal rod a force to be sensed so that the length of at least the first crystal rod changes in response to the applied force; and detecting a phase shift between the first and second light signals exiting the first and second crystal rods, respectively, wherein the detected phase shift is responsive to the change in length of at least the first crystal rod and thus to the force applied thereto;

wherein:

said applying a force includes flowing a fluid adjacent the first and second crystal rods; and said method further comprises disposing the first and second crystal rods parallel to the fluid flow but in oppositely oriented directions.

12. A method as defined in claim 11, wherein the first and second crystal rods are collinear.

* * * * *